J. C. KIMBALL.
Carriage-Top.
No. 25,420.
Patented Sept. 13, 1859.
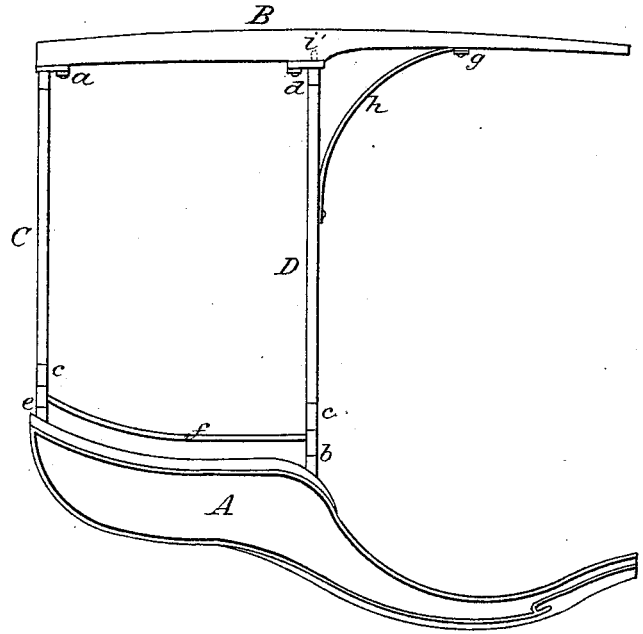
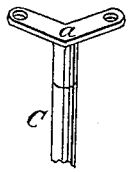
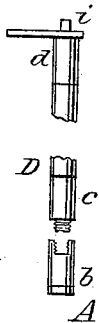
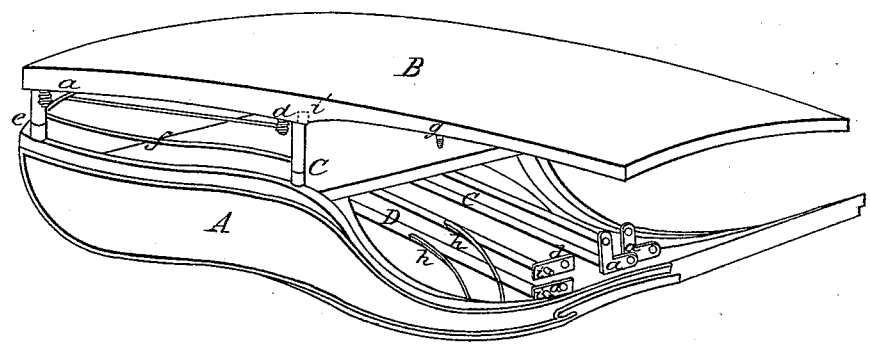
Witnesses:
C. O. Crosby
R. Fitzgerald
Inventor:
J. C. Kimball

UNITED STATES PATENT OFFICE.

JOHN C. KIMBALL, OF NEW HAVEN, CONNECTICUT.

MOVABLE TOP FOR CARRIAGES.

Specification of Letters Patent No. 25,420, dated September 13, 1859.

*To all whom it may concern:*

Be it known that I, JOHN C. KIMBALL, of the city and county of New Haven, in the State of Connecticut, have invented a new and useful Improvement in Shifting-Top Rockaways; and I do hereby declare that the following is a full, clear, and exact description of the construction, character, and operation of the same, reference being had to the accompanying drawings, which make part of this specification, in which—

Figure 1, is a plan of a longitudinal section of the carriage body, and top, showing it as a direct side view. Fig. 2, is a perspective view of the carriage body, and top, when placed in a situation to be packed for transportation. Fig. 3, is a perspective view of the upper end of one of the rear, or corner, standards, or supports, as seen near $a$, Fig. 1. Fig. 4, is a plan of one of the short studs, and of the lower, and upper, sections of one of the side standards, or supports, of the top, showing the manner of attaching them to both the body, and the top, of the carriage, at $b$, $c$, and $d$, Fig. 1.

My improvement consists in so constructing the standards, or supports of the top, and attaching them by means of screws, as to enable me to remove the top, and standards, at pleasure, and to attach them to another carriage, if desired, or, to leave the top off, when it is not wanted:—but more especially, to enable me to pack the body, and top, for transportation, in less than one half the space required for the permanent topped rockaway.

I make the body, substantially, in the form shown at A, Fig. 2, and indicated, in section, in Fig. 1, with four short studs attached, two of which are shown at $b$, and $e$, Figs. 1, and 2. To these studs I attach the wings, or rails, as shown at $f$, Figs. 1, and 2, which make a complete finish between the studs, when the top is off. (One of these studs is shown at $b$, Fig. 4.) These studs are furnished with concave, or female, screws, as indicated at $b$, Fig. 4, to receive convex, or male, screws, as shown at $c$, Fig. 4, which represents the lower end of one of the standards, (and they are all alike at that end.)

I make the top, substantially, in the form shown at B, Fig. 2, and indicated, in section, in Fig. 1, to which I attach screws with nuts, as shown at $a$, $d$, and $g$, Fig. 1, (the screws only are shown at $a$, $d$, and $g$, in Fig. 2,) by means of which I attach the standards, or supports, to the top, as there shown.

I make the standards, or supports of the top, C, and D, (and others like them not shown,) of wood, or any other suitable material, substantially, as shown in two parts, in Fig. 4, that is, with a male screw at the lower end, as shown at $c$, Fig. 4, and a cross bar, or projecting plate, at the upper end, as shown at $d$, Figs. 4, and 1, and also as lying in the front part of the body, in Fig. 2, (where the screw holes are shown,) and a curved brace, as shown at $h$, Figs. 1, (also lying in the body, Fig. 2.)

The upper ends of the two rear, or corner, standards, as C, are made in the shape shown at $a$, Fig. 3, and, also, as lying in the body, in Fig. 2, so as to be attached by two screws, (only one of which is seen at $a$, Figs. 1, and 2, but the other will be readily understood,) but the lower end is made with a male screw, precisely as shown at $c$, Fig. 4.

Having constructed the several parts, as before described, I screw the two side standards, or supports, as D, into the studs, $b$, in the body; and the two rear, or corner, standards, or supports, as C, into the studs, $e$, and put on the top, when the projection, $i$, Figs. 4, and 2, will enter the hole in the top, indicated by dots, at $i''$, Figs. 1, and 2, and the screws, at $a$, $d$, and $g$, will enter the holes in the cross pieces at the upper ends of the standards, or supports, and in the brace, $h$. I then turn on the nuts, as at $a$, $d$, and $g$, when the whole will appear in a direct side view, as represented in Fig. 1, and will be ready for use, as a standing top carriage, and when I desire to use the carriage without a top, or, to shift the top to another carriage, or, to pack the carriage for transportation, I first take off the nuts, at $a$, $d$, and $g$, (and the corresponding ones on the other side,) and remove the top. I then unscrew the standards, or supports, C, and D, (and others like them, not seen,) when the body will appear like any carriage of that character which never had a top;—and the same top may be placed on any other carriage of the same make.

When I desire to pack the carriage for transportation, I place the top, B, upon the body, A, place the two standards, C, and the two standards, D, within the body, all as shown in Fig. 2, and inclose the whole in a box, when it will be ready for shipment, or for any other conveyance, to its destination.

The advantages of my improvement consist in that I can attach, or remove, the top most readily for any purpose whatever, without marring the symmetry of the carriage, and, therefore, the top may be shifted from one carriage to another, at pleasure; or, the carriage may be used with, or without it, as may be desired, at any time:—and in that I can pack it, for transportation, in much less than half the space which would be required to pack a carriage of the same class with a permanent top:—This is the greatest advantage in my improvement, as it will save more than half the expense of transportation, (perhaps two thirds, as it will be much more convenient to handle than a box of more than twice its size).

Instead of the body being made as before described, it may be made in any of the forms now in use, or hereafter to be invented, or discovered:—And, instead of four standards, only, as described, any greater number may be used, when desired:—And, instead of limiting it to rockaways, it is equally applicable to all other carriages with standing tops where it might be desirable, at times, to remove, or shift, the tops, or to pack them for transportation.

I am aware that shifting tops have been known for years, as applied to the calash tops. I, therefore, do not claim a shifting top, as such, as my invention, but—

What I claim as my invention, and desire to secure by Letters Patent, is—

1. So constructing the standards, or supports, of a standing top carriage, and attaching them by means of screws, that the top, and standards, or supports, may be readily removed, when the whole is constructed, and connected, substantially, as herein described, and for the purposes herein set forth.

2. I claim the combination of the standards with the body, when the standards are secured by being screwed into the upper ends of the studs, and the whole is constructed, arranged, and made to serve the purpose intended, substantially, as herein described.

J. C. KIMBALL.

Witnesses:
  C. O. Crosby,
  R. Fitzgerald.